United States Patent [19]
Duke et al.

[11] Patent Number: 6,080,696
[45] Date of Patent: Jun. 27, 2000

[54] METHOD FOR CLEANING FOULED ION EXCHANGE RESINS

[75] Inventors: Hilton Duke, Cremorne, Australia; John L. Featherstone, El Centro, Calif.; Charles R. Marston, Midland, Mich.

[73] Assignees: MidAmerican Energy Holdings Company, Omaha, Nebr.; The Dow Chemical Company, Midland, Mich.

[21] Appl. No.: 09/128,593

[22] Filed: Aug. 3, 1998

Related U.S. Application Data

[60] Provisional application No. 60/080,381, Apr. 1, 1998.
[51] Int. Cl.$^7$ ............................... B01J 20/34; B01J 38/60
[52] U.S. Cl. .................... 502/27; 502/22; 502/25; 502/28
[58] Field of Search ................ 502/22, 25, 27, 502/28

[56] References Cited

U.S. PATENT DOCUMENTS

| | | | |
|---|---|---|---|
| 4,886,598 | 12/1989 | Barkey | 210/263 |
| 5,019,542 | 5/1991 | Bento | 502/25 |
| 5,409,737 | 4/1995 | Kozak et al. | 427/435 |
| 5,453,201 | 9/1995 | Etzel et al. | 210/668 |

*Primary Examiner*—Elizabeth D. Wood
*Attorney, Agent, or Firm*—Morrison & Foerster, LLP

[57] ABSTRACT

Methods are disclosed for the regeneration of fouled ion exchange (IX) resins. In one embodiment, the fouled resin is treated simultaneously with reducing agent and acid. In a preferred embodiment, fouled resin is treated with reducing agent and then with acid. Use of reducing agent prior to the use of acid results in surprisingly unexpected improved cleaning as compared to simultaneous treatment with reducing agent and acid.

21 Claims, No Drawings

METHOD FOR CLEANING FOULED ION EXCHANGE RESINS

CROSS-REFERENCE TO RELATED APPLICATIONS

This application claims the benefit of U.S. Provisional Application Ser. No. 60/080,381, filed Apr. 1, 1998, the disclosure of which is incorporated herein by reference.

TECHNICAL FIELD

The invention relates to the art of cleaning and regenerating ion exchange resins, and particularly to the removal of iron fouling from ion exchange resins.

BACKGROUND ART

Industrial ion exchange resins are used for a variety of processes, ranging from water softening to metal mining operations. When used to extract ions from complex or dirty mixtures, the resins can become fouled with suspended solids or materials that precipitate in the ion exchange resin during processing. Ion exchange resin fouling is a significant problem in the industrial setting, given the large quantities and high unit cost of the resins.

Iron fouling is a widespread and difficult problem for industrial ion exchange resins. Fouling of ion exchange resins by iron can occur by deposition of suspended iron-containing solids or by precipitation, such as that due to oxidation of iron compounds in solution.

Geothermal brines present a particular problem with respect to fouling of ion exchange resins. These brines, which can be obtained by drilling into geothermal formations, are extremely hot and under great pressure. Although sodium, potassium and calcium chlorides comprise the bulk of the dissolved material, the brines contain large quantities of other dissolved ions, including iron, manganese, silicates, zinc, and other metals. Some processes for recovery of commercially valuable metals from geothermal brines incorporate ion exchange "capture" steps, which can semi-selectively bind the metal of interest. However, if the brine contains large amounts of iron and/or calcium, either as suspended solids or dissolved salts, these metals can contaminate the ion exchange resin, reducing the capacity and lifespan of the resin.

Some preparations are commercially available for removing iron fouling. The product Iron Out®, a mixture of sodium dithionite and sodium bisulfite, (Iron Out, Inc., Ft. Wayne, Ind.) can be effective for minor iron fouling of ion exchange resins. However, heavy iron fouling requires more stringent cleaning products and/or procedures.

Accordingly, there is a need in the art for a simple, highly efficient method for removing fouling from ion exchange resins.

DISCLOSURE OF THE INVENTION

The invention relates to methods for removing metal and mineral fouling from ion exchange resins to produce regenerated ion exchange resins.

In one embodiment, a fouled ion exchange resin is first mixed thoroughly and intimately with reducing agent and then incubated, the reducing agent is then drained and replaced with an acid. The acid/resin mixture is incubated, then the acid is removed, resulting in a regenerated ion exchange resin.

In another embodiment, a fouled ion exchange resin is mixed with reducing agent, then an acid is added to the reducing agent/resin mixture. Removal of the reducing agent/acid solution results in a regenerated ion exchange resin.

Sodium dithionite is a preferred reducing agent and hydrochloric acid is a preferred acid.

MODES OF CARRYING OUT THE INVENTION

The inventors have discovered new methods for cleaning metal and mineral fouled ion exchange (IX) resins. Sequential addition of reducing agent and an acid to fouled IX resin results in surprisingly and unexpectedly superior cleaning compared to simultaneous treatment with reducing agent and acid.

The instant invention is useful for cleaning metal and mineral fouling from a variety of different IX resins. Any resin having a support media and active group resistant to reducing agent and acid may be cleaned according to the instant methods. The instant invention is particularly applicable to cleaning resins fouled by iron, particularly ferric iron compounds, during metal recovery operations, especially metal recovery from geothermal brines.

Fouled IX resins are drained prior to cleaning. Preferably, the fouled IX resin is screened to remove fine solids and then rinsed with water and drained, to remove any residual liquid from the industrial process in which the resin was employed.

In a preferred embodiment of the invention, drained fouled IX resin is mixed with reducing agent. The reducing agent may be in the form of a solid, such as a powder or crystals, or may be in concentrated solution. In the case that the reducing agent is in solid form, some water may be added to the reducing agent/fouled IX resin mixture. Suitable reducing agents include, but are not limited to, sodium dithionite, sodium bisulfite, sodium sulfite, sodium thiosulfate, iron metal filings, stannous chloride, aluminum metal powder, sodium formate, formaldehyde, sodium formaldehyde bisulfite, sodium formaldehyde sulfoxylate, carbon disulfide, sulfur, potassium iodide, potassium cyanide, hydroquinone, phenol, t-butanol, ethylene glycol, methanol, butyraldehyde, glyoxal and the like. Sodium dithionite is a preferred reducing agent. Adequate mixing of fouled resin with reducing agent, whether in solid or liquid form, is necessary for best results. Preferably, at least 0.1 pound of reducing agent is added per cubic foot of fouled IX resin. More preferably, at least 0.5 pound of reducing agent is added per cubic foot of fouled IX resin. Most preferably, at least 1 pound of reducing agent is added per cubic foot of fouled IX resin. The amount of water added is relative to the amount of reducing agent added and the amount of fouled IX resin and is kept to a minimum to minimize dilution of the reducing agent, as will be apparent to one of skill in the art. If sodium dithionite is used as the reducing agent, a small quantity of sulfur dioxide gas is given off as the sodium dithionite reacts with the iron-fouled resin.

The reducing agent/fouled IX resin mixture is mixed thoroughly and intimately, and optionally may be allowed to incubate. In the case that the reducing agent/fouled IX resin mixture is allowed to incubate, the mixture should be stirred occasionally. Stirring should be gentle in order to not damage the resin beads. Reducing agent incubations are preferably at ambient temperature, but heating or cooling of the incubating mixture is contemplated within the invention. In the case that a reducing agent incubation is employed, the incubation is preferably from about 10 minutes to about 2 hours, more preferably from about 15 minutes to about 1 hour, and most preferably from 20 minutes to about 45 minutes.

The reducing agent is then drained from the fouled IX resin. Concentrated acid is then added directly to the drained, fouled IX resin. The acid may be hydrochloric acid, sulfuric acid, citric acid, formic acid, phosphoric acid and the like. Concentrated (32%) hydrochloric acid (HCl) is a preferred acid. Sufficient acid is added to completely submerse the IX resin. After addition of the acid, the acid/fouled IX resin mixture is thoroughly and intimately mixed.

The acid/fouled IX resin mixture may be optionally incubated for a period. The incubation period may range from about 10 minutes to about 2 hours and is preferably about 15 minutes to about 1 hour, more preferably from about 20 minutes to about 45 minutes. Any incubation of the acid/fouled IX resin mixture is preferably at ambient temperature, although heating or cooling of the incubation mixture is contemplated within the invention. However, if the incubation is heated, care must be taken, given the hazardous nature of strong acids. After incubation, the acid is drained from the IX resin and the IX resin is washed several times with water to yield a regenerated IX resin substantially similar to unused resin.

In another embodiment, the reducing agent and acid are added to the fouled IX resin. This mixture is then mixed. This mixture may optionally be incubated, with incubation times ranging from about 2 hours to about 8 hours, and is preferably from about 3 hours to about 5 hours, more preferably from about 3.5 hours to about 4.5 hours. Any incubation of the reducing agent/acid/fouled IX resin mixture is preferably at ambient temperature, although heating or cooling of the incubation mixture are contemplated within the invention. However, if the incubation is heated, care must be taken, given the hazardous nature of strong acids.

Following any incubation period, the reducing agent/acid solution is drained from the IX resin. The IX resin is washed with water or other solvent appropriate to the IX resin, as will be apparent to one of skill in the art, to yield a regenerated IX resin.

The patents, patent applications, and publications cited herein are incorporated by reference herein in their entirety.

The following working examples are intending to exemplify the invention, and are not intended to limit the scope of the invention in any way.

EXAMPLES

Example 1
Combined Reducing Agent/Acid Cleaning Method

A wash vessel was partially filled with 250 ml of reverse osmosis water. With a recirculation flow rate of 10 mL/minute in the vessel, 37 g. of sodium dithionite was added. When the sodium dithionite was completely dissolved, 25 mL of concentrated (32%) hydrochloric acid was added. Immediately after adding the acid, about 600 mL of screened and rinsed iron-fouled IX resin was added while recirculation was continued. After addition of the resin, the recirculation flow was decreased and continued for 2 hours. The resin was then drained, and then rinsed and drained three times with fresh batches of water and while recirculating for 20 minutes per batch before draining. This cleaning method resulted in partially cleaned resin as evidenced by microscopic examination of the resin beads by clearing of a portion of the outer shell.

Example 2
Two-Step Cleaning Method

In view of the results obtained in the cleaning method of Example 1 above, a two-step cleaning method was devised. In the laboratory, approximately 37 g of sodium dithionite dissolved in 250 mL water was mixed very thoroughly with about 600 mL of drained, iron-fouled IX resin. The mixture was allowed to incubate for about 1 hour and was stirred about every 15 minutes. After incubation, the sodium dithionite solution was drained from the resin and an amount of concentrated hydrochloric acid (32%) sufficient to cover the resin was added and allowed to incubate for about 1 hour with stirring every 15 minutes. After incubation, the hydrochloric acid was drained from the resin. The resin was then washed three times with reverse osmosis water to yield a regenerated resin substantially similar to unused resin.

Example 3
Comparative Results

Four identical samples of iron-fouled IX resin were treated using different protocols as described in Table 1 below to determine the amount of reducing agent required to regenerate the resin.

TABLE 1

| | 50 mL of Resin/Sample | | | | | | | |
|---|---|---|---|---|---|---|---|---|
| | #1 5 lbs/cuft Dith. Dose | | #2 5 lbs/cuft | | #3 3.5 lbs/cuft Dith. Dose | | #4 0.0 lbs/cuft Dith. Dose | |
| Time Minutes | g (85%) (33%) | Acid Dose mL | Dith. Dose g (85%) | Acid Dose mL (33%) | g (85%) (33%) | Acid Dose mL | g (85%) (33%) | Acid Dose mL |
| 0 | 2 | NA | 2 | 1.2 | 1.4 | 1.2 | NA | 14 |
| 30 | 1 | NA | 1 | 1.2 | 0.7 | 1.2 | NA | 0 |
| 60 | 1 | NA | 1 | 1 | 0.7 | 1 | NA | 0 |
| | Water = 7 mL | | Water = 5 mL | | Water = 5 mL | | Water = 0 mL | |

After incubating the above samples for about 45 minutes, none of the samples had developed transparent cores. All of the acidified samples, #2–#4, had developed substantially transparent outer shells to about ⅓ to about ½ of the radius of the resin bead. After about 5 hours incubation, the resin beads in Sample #4, concentrated HCl only, still had dark brown cores. After overnight incubation, the liquid in Sample #4 was transparent and the resin bead cores were nearly colorless.

After 45 minutes incubation, Sample #1, which was not acidified, maintained a dark brown color with no visible sign of cleaning. At that point, sample #1 was dewatered and then immersed in concentrated HCl (32%) for ten minutes. Surprisingly, this two-step process allowed for the removal of the iron trapped in the resin cores. The resin cores became transparent while the liquid surrounding the resin was intensely yellow. This two-step process for cleaning the iron-fouled resin demonstrated that reducing agent in the absence of acid can more efficiently release iron from iron-fouled resin. Incubation with acid is required, however, for the solubilization and removal of the "released" iron. Subsequent experiments using the two-step process showed that doses of sodium dithionite from about 0.1 to about 1.0 lb/cuft resin were effective in cleaning iron-fouled resin.

Example 4
Method for Cleaning IX Resin in Pilot Plant for Recovery of Zinc from Geothermal Brine Using a SWECO screen, IX resin is de-watered in batches of 3–5 gallons of IX resin per batch. The screen discharge is blocked and then approximately 3–5 gallons of IX resin were placed on the screen and the screen was activated to remove excess water. Approximately 250 mL of sodium dithionite powder was added to batches of the de-watered resin on the screen and mixed thoroughly and intimately until the entire volume of resin was treated. The resin/sodium dithionite mixture was discharged to a conical vessel and allowed to incubate for 1 hour. After incubation, water was siphoned off to empty labeled plastic drums. Concentrated hydrochloric acid (32% HCl) was then added to the conical vessel in amount sufficient to cover the resin by 2 inches. While the mixture was allowed to incubate for 1 hour, it was mixed every 15 minutes. After incubation, the acid solution was siphoned off to empty labeled plastic drums. Concentrated HCl was added again in an amount sufficient to cover the resin by 2 inches and then allowed to incubate for 1 hour with mixing every 15 minutes. After incubation, the acid solution was siphoned off as above and saved for use with the next batch of fouled resin. The resin was then rinsed with reverse osmosis water to remove the acid solution. The cleaned IX resin was then installed in the IX column and rinsed with a minimum of 10 bed volumes (BV) of hot reverse osmosis water before activating the column.

We claim:

1. A method for cleaning a fouled ion exchange (IX) resin, comprising:

mixing said fouled IX resin with a reducing agent, thereby forming a reducing agent/IX resin mixture;

draining said reducing agent from said mixture, thereby forming a reducing agent-treated IX resin;

mixing an acid with said reducing agent-treated IX resin, thereby forming an acid/IX resin mixture;

draining said acid from said acid/IX resin mixture; and recovering a cleaned IX resin.

2. The method of claim 1 wherein said reducing agent is mixed at a ratio of at least 0.1 pounds of reducing agent per cubic foot of fouled IX resin.

3. The method of claim 1 wherein said reducing agent is mixed at a ratio of at least 0.5 pounds of reducing agent per cubic foot of fouled IX resin.

4. The method of claim 1 wherein said reducing agent is mixed at a ratio of at least 1 pound of reducing agent per cubic foot of fouled IX resin.

5. The method of claim 1 wherein said acid is concentrated hydrochloric acid (HCl).

6. The method of claim 5 wherein the concentration of said HCl is 32%.

7. The method of claim 1 wherein said reducing agent is selected from the group consisting of sodium dithionite, sodium bisulfite, sodium sulfite, sodium thiosulfate, iron metal filings, stannous chloride, aluminum metal powder, sodium formate, formaldehyde, sodium formaldehyde bisulfite, sodium formaldehyde sulfoxylate, carbon disulfide, sulfur, potassium iodide, potassium cyanide, hydroquinone, phenol, t-butanol, ethylene glycol, methanol, butyraldehyde and glyoxal.

8. The method of claim 1 wherein said reducing agent is sodium dithionite.

9. The method of claim 1 further comprising rinsing said cleaned IX resin with water after draining said acid.

10. The method of claim 1 further comprising allowing said reducing agent/IX resin mixture to incubate.

11. The method of claim 1 further comprising allowing said acid/IX resin mixture to incubate.

12. A method for cleaning a fouled ion exchange (IX) resin, comprising:

mixing said fouled IX resin with reducing agent, thereby forming a reducing agent/IX resin mixture;

mixing an acid with said reducing agent/IX resin mixture, thereby forming an acid/reducing agent/IX resin mixture;

draining said acid and reducing agent from said acid/reducing agent/IX resin mixture; and recovering a cleaned IX resin.

13. The method of claim 12 wherein said reducing agent is mixed at a ratio of at least 0.1 pounds of reducing agent per cubic foot of fouled IX resin.

14. The method of claim 12 wherein said reducing agent is mixed at a ratio of at least 0.5 pounds of reducing agent per cubic foot of fouled IX resin.

15. The method of claim 12 wherein said reducing agent is mixed at a ratio of at least 1 pound of reducing agent per cubic foot of fouled IX resin.

16. The method of claim 12 wherein said acid is concentrated hydrochloric acid (HCl).

17. The method of claim 16 wherein the concentration of said HCl is 32%.

18. The method of claim 12 wherein the reducing agent is sodium dithionite, sodium bisulfite, sodium sulfite, sodium thiosulfate, iron metal filings, stannous chloride, aluminum metal powder, sodium formate, formaldehyde, sodium formaldehyde bisulfite, sodium formaldehyde sulfoxylate, carbon disulfide, sulfur, potassium iodide, potassium cyanide, hydroquinone, phenol, t-butanol, ethylene glycol, methanol, butyraldehyde and glyoxal.

19. The method of claim 12 wherein the reducing agent is sodium dithionite.

20. The method of claim 12 further comprising allowing said reducing agent/acid/IX resin mixture to incubate.

21. The method of claim 12 further comprising rinsing said cleaned IX resin with water after draining said reducing agent and said acid.

* * * * *